April 22, 1930.  W. C. ANTHONY  1,755,803
DUMPING BODY
Filed Jan. 18, 1926  2 Sheets-Sheet 1
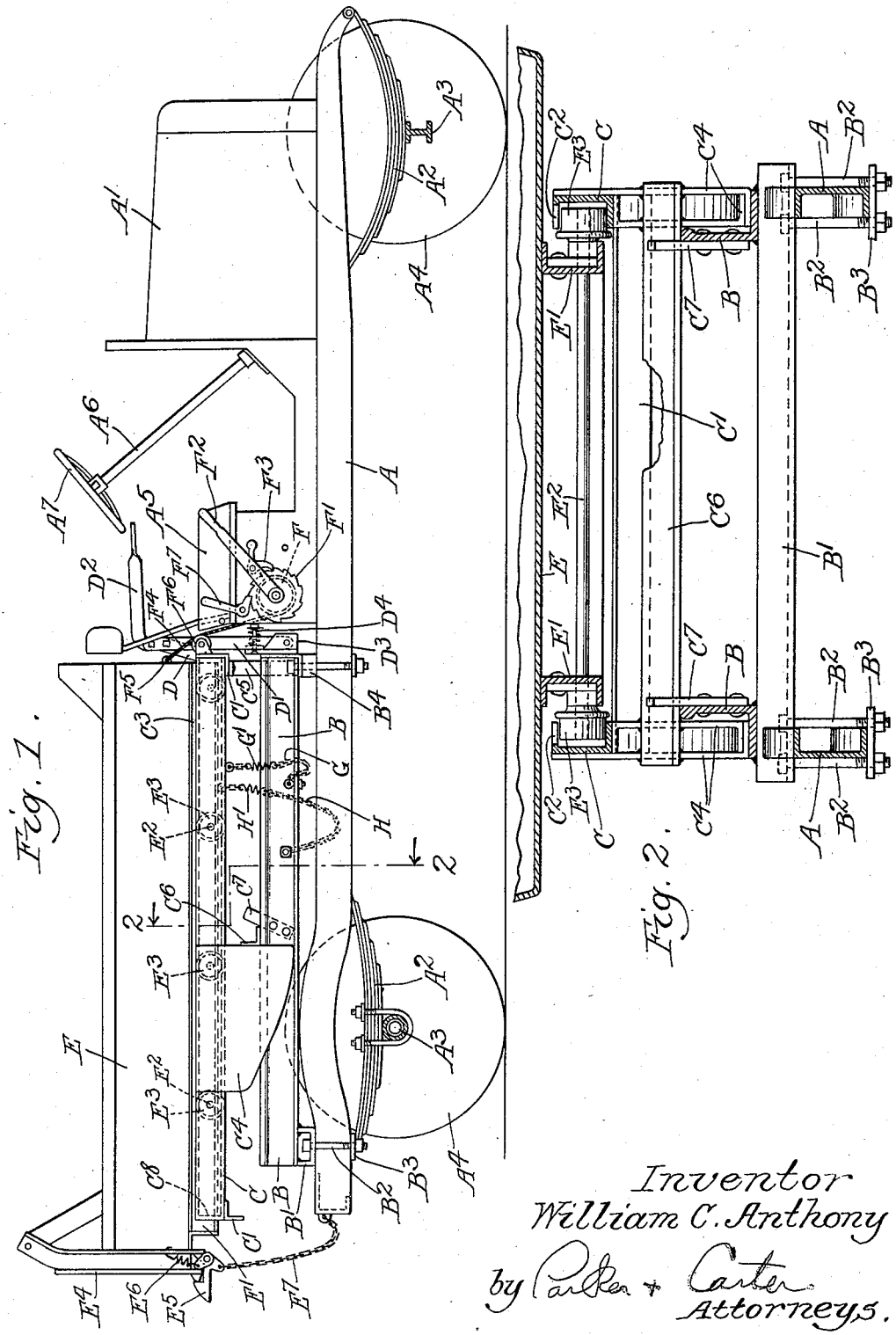
Inventor
William C. Anthony
by Parker & Carter
Attorneys.

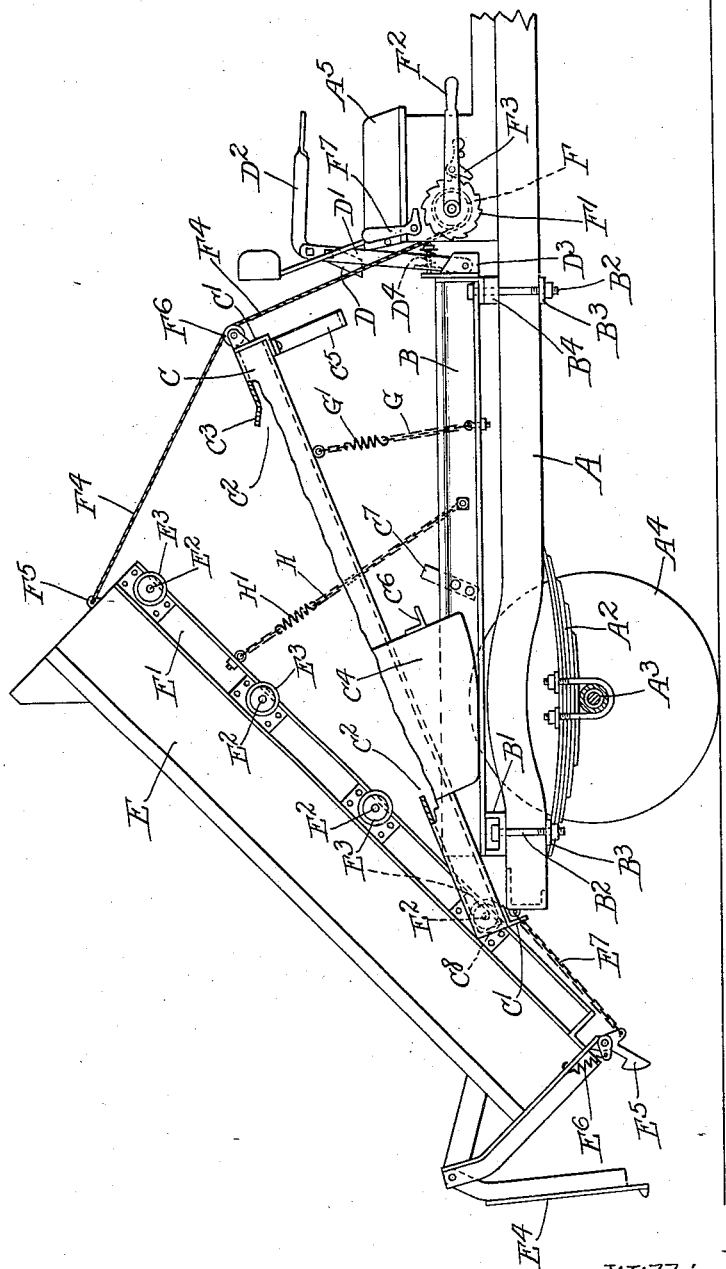

Patented Apr. 22, 1930

1,755,803

UNITED STATES PATENT OFFICE

WILLIAM C. ANTHONY, OF STREATOR, ILLINOIS, ASSIGNOR TO ANTHONY COMPANY, OF STREATOR, ILLINOIS, A CORPORATION OF ILLINOIS

DUMPING BODY

Application filed January 18, 1926. Serial No. 81,936.

This invention relates to a receptacle and means for dumping the same. In the form illustrated herewith it is shown as embodied in a dumping body mounted on an automotive vehicle. One of the objects of the invention is to provide in connection with a tipping receptacle, dumping mechanism adapted to move the receptacle laterally a distance greater than that normally incident to the tipping movement alone. Another object is to provide in connection with an automotive vehicle a tipping mechanism and a body resting on such mechanism and movable with relation thereto. Other objects will appear from time to time throughout the specification and claims.

My invention is illustrated more or less diagrammatically in the accompanying drawing, wherein:

Figure 1 is a side elevation;

Figure 2 is a vertical cross section on an enlarged scale taken on line 2—2 of Figure 1;

Figure 3 is a side elevation with parts broken away showing the body in the dumped position.

Like parts are indicated by like characters throughout.

A is the frame of an automobile. $A^1$ represents the engine compartment. $A^2$ $A^2$ are springs supporting axles $A^3$ $A^3$ and $A^4$ $A^4$ are wheels. $A^5$ is a seat. $A^6$ the steering column and $A^7$ a steering wheel. These parts will not be described in detail as they form no special part of the present invention, and the invention is not limited to the mounting of a dumping receptacle mechanism upon an automotive vehicle.

B B are rails or tracks, mounted upon the vehicle frame and carried at their rear ends upon a cross member $B^1$ which is supported adjacent the rear end of the vehicle frame and fastened thereto by bolts $B^2$ $B^2$ which engage short cross members $B^3$ $B^3$, beneath the frame members A. $B^4$ is a cross member upon which the forward ends of the tracks B are carried and it is fastened to the frame by bolts $B^2$ and short cross members $B^3$, which are the same as the other bolts described above.

C C are generally channel shaped track members. They are fastened together by suitable cross members $C^1$ $C^1$ at or near their ends. The upper flange of the channel is cutaway throughout a considerable part of its length as at $C^2$, and adjacent the forward end of each of the tracks the remaining portion of the upper flange is upwardly bent as at $C^3$. Fastened to each of the track members C and extending beneath it is a cam or rocker member $C^4$. Each of these members rests upon one of the tracks B and supports the upper track members C from them. Adjacent the forward end of the tracks C is a supporting member $C^5$ which rests upon the cross member $B^4$ when the body is in the upright or untipped position as shown in Figure 1. $C^6$ is a strengthening and load supporting member which extends laterally across and joins the cams $C^4$. When the body is in the full upright position, this member contacts the tops of the tracks B and to some degree serves to support the load and body. $C^7$ $C^7$ are limiting and guiding members fastened one on each of the tracks B. $C^8$ is a stop to limit the downward movement of the body with respect to the tipping frame C $C^1$.

D is a locking latch carried on a lever $D^1$ provided with a forwardly bent portion $D^2$. The lever $D^1$ is pivoted in a fitting $D^3$ and is normally held in the locking position by a coil spring $D^4$.

E is a dumping body or receptacle. It is provided beneath it with a reinforcing frame built up of members $E^1$ $E^1$. Extending laterally between such members and passing through each of them is a series of axles or shafts $E^2$ at the outer end of each of which is positioned a roller $E^3$. The body E is provided with a tail gate $E^4$ which is normally held closed by a latch structure $E^5$ which has a spring $E^6$ tending normally to hold it in locking position as shown in Figure 1. $E^7$ is a tripping chain fastened to a portion of the latch structure and fastened also to the rear of the vehicle frame. As the body tips as shown in Figure 3 this tripping chain is drawn tight and trips the latch.

F is a drum mounted as here shown beneath the driver's seat $A^5$. It has in connection with it a ratchet wheel $F^1$, an operating lever F² which carries a dog F³. F⁴ is a cable fastened to the body E at F⁵ and passing over the pulley F⁶ mounted at the forward end of the track structure C C¹. The cable is fastened to the drum F and when the drum is rotated by the handle F², the ratchet F¹, and the dog F³ the cable is drawn in about the drum and the parts of the vehicle are moved back from the dumping position shown in Figure 3 to the upright or untipped position shown in Figure 1. F⁷ is a detent pawl by means of which the tipping of the body beyond a fixed limit may be prevented or by means of which the tipping movement of the body may be stopped once it has been initiated.

G is a limiting chain fastened as here shown to one of the tracks B and to one of the side members C. It is provided with a spring or cushioning elements G¹ which serve to reduce or eliminate shock when the member C has tipped to its limit.

H is a similar chain fastened also to the track B and fastened at the other end to the frame member E¹. It is provided with a spring H¹.

Although I have shown an operative device, still it will be obvious that many changes might be made in size, shape and arrangement of parts without departing materially from the spirit of my invention; and I wish therefore that my showing be taken as in a sense diagrammatic.

Where in the claims the word "framework" is used, it will be understood that the inventor is not limiting himself specifically to a framework. Other equivalent supporting means might be used and the word framework is therefore to be understood as referring not merely to framework but to its equivalent as a supporting means for carrying the parts which are carried in the form illustrated by the framework.

The use and operation of my invention are as follows:

In normal operation when a load is to be received or carried, the parts are in the position shown in Figure 1. In that position the body and frame are held against tipping. When it is desired to tip the load, the drum, latch, and detent pawl are set so as to permit unwinding of the drum and the body latch is dropped by pressing downwardly on the handle D² and the body is then free to dump. It is preferably so balanced with relation to its supporting rocker that as soon as it is free to dump it will do so under the influence of gravity and without any starting impulse or power. The body tips until the members C C¹ have reached approximately the position of inclination shown in Figure 3 and in that position the frame is checked.

When the frame C C¹ has tipped to the position shown in Figure 3, the body proper will slide downward along the tracks C¹ and the forwardmost pair of rollers will thus move out beyond the upwardly bent portion C³ of the flange and the rearmost pair of rollers will move downward along the tracks C and are held against upward or outward movement by the portion of the flange which has not been cut away. The tipping movement of the body and its frame and rollers will continue during this operation. As soon as the front pair of rollers has cleared the curved portion C³ the body and its attached frame slide or roll rearwardly "down hill" with relation to the tracks C and as soon as the body is free to do so it tips to the position of inclination shown in Figure 3, its tipping movement being restrained and checked by the restraining chain shown. As the body finally moves to approximately the extreme position of tip the tripping chain E⁷ is drawn taut as shown in Figure 3, the latch opened and the gate permitted to swing open under the influence of the load within so as to permit dumping of the load.

Under the same conditions, when the body has dumped the load, and is free to return, it will tend to return to an upright position under the influence of gravity alone. In order to assist this movement and make it certain, the drum, cable and ratchet mechanism provided is shown. When the body has dumped its contents and if it does not return automatically to an upright position, the operator adjusts the detent pawl and the dog on the ratchet handle to permit winding up of the drum and then winds the drum by an up and down movement of the handle, and thus the cable is drawn in, the frame C C¹ is brought to the horizontal position and the body and its attached frame E¹ are drawn down again into contact with the tracks C, the body is drawn forward so that the front pair of rollers is again brought under the flanged portion C³ and the body is moved slightly forward and downward in the position shown in Figure 1.

By means therefore of this construction the body dumps in effect in a two step operation. In the first step the frame C C¹ and the body tip as a unit. When the frame C C¹ has completed approximately its entire dump, the body moves to the rear with relation to this frame and tips when positioned as shown in the drawings, a distance substantially equal to the distance which the frame C C¹ has already tipped. By this construction the body is moved bodily to the rear a distance sufficient to clear the rear of the vehicle frame and to carry out a sufficiently steep tilt to free it of its contents.

I claim:

1. In combination with a support, a carrying part and a member carrying said part, and resting upon said support and adapted of itself to tip the carrying part, a receptacle resting on said carrying part and adapted to move with it and to move laterally with relation to it and to tip with relation to it.

2. In combination with a support, a carrying part and a member carrying said part, and resting upon said support and adapted of itself to tip the carrying part, a receptacle resting on said carrying part and adapted to move with it and to move laterally with relation to it and to tip with relation to it, means for limiting the tipping of the carrying part and the receptacle and means for moving the two from the tipped position to the untipped position.

3. In combination with a support, a framework and a member supporting such framework from such support, adapted of itself to tip to cause the framework automatically to tip when free to do so, and a receptacle on such framework adapted to move with relation thereto and in addition to tip with relation thereto, and means in combination with such framework adapted to permit relative lateral motion of the receptacle with respect to such framework, such means formed to prevent tipping of the receptacle with respect to the framework until a predetermined lateral movement has occurred.

4. In combination with a support, a framework and a member supporting such framework from such support, adapted of itself to tip to cause the framework automatically to tip when free to do so, and a receptacle on such framework adapted to move with relation thereto and in addition to tip with relation thereto, such member being cam-shaped and adapted to cause the framework and body to move to a tipping position when free for movement, and means in combination with such framework adapted to permit relative lateral motion of the receptacle with respect to such framework, such means formed to prevent tipping of the receptacle with respect to the framework until a predetermined lateral movement has occurred.

5. In combination with a support, a carrying part supported therefrom and adapted of itself to tip with relation thereto, and a receptacle carried by such carrying part and adapted to move laterally with relation thereto and to tip with relation thereto in a certain position and held against tipping in others.

6. In combination with a support, a carrying part supported from such support and adapted of itself to tip with relation thereto, and a receptacle mounted upon said carrying part and adapted to move therewith, and adapted to have lateral movement relative thereto and adapted to tip with relation thereto after a predetermined amount of lateral movement has taken place, such receptacle being held against tipping with relation to the carrying part when the two are in the carrying position.

7. In combination with a support, a carrying framework and means for supporting such framework from such support, and for tipping the same automatically with relation thereto when free for tipping movement, such framework embodying a track, a receptacle carried on such track, and adapted to move therealong, said track being so formed as to permit tipping of the receptacle with relation to the track when the receptacle lies on one portion of the track, the track being so formed as to prevent tipping of the receptacle with relation thereto when the receptacle lies upon another portion of the track.

Signed at Chicago, county of Cook and State of Illinois, this 14th day of January, 1926.

WILLIAM C. ANTHONY.